United States Patent [19]

Misawa et al.

[11] 4,456,514
[45] Jun. 26, 1984

[54] CATIONIC ELECTROPHORETIC COATING PROCESS

[75] Inventors: Masayuki Misawa; Hidetaka Yago, both of Hiratsuka, Japan

[73] Assignee: Kansai Paint Co. Ltd., Japan

[21] Appl. No.: 406,992

[22] Filed: Aug. 10, 1982

Related U.S. Application Data

[63] Continuation of Ser. No. 224,281, Apr. 10, 1980, abandoned.

[30] Foreign Application Priority Data

Aug. 23, 1978 [JP] Japan .................................. 53-103159

[51] Int. Cl.$^3$ ...................... C25D 13/06; C25D 21/18; C25D 21/20
[52] U.S. Cl. ................................................. 204/181 C
[58] Field of Search ..................................... 204/181 C

[56] References Cited

U.S. PATENT DOCUMENTS

| | | | |
|---|---|---|---|
| 3,444,066 | 5/1969 | Brewer et al. .................. | 204/181 C |
| 3,922,212 | 11/1975 | Gilchrist ......................... | 204/181 C |
| 4,159,233 | 6/1979 | Ting et al. ...................... | 204/181 C |

*Primary Examiner*—Howard S. Williams
*Attorney, Agent, or Firm*—Larson and Taylor

[57] ABSTRACT

In an electrophoretic coating process with use of a cationic electrophoretic coating composition having its pH adjusted to 6 to 8, the cationic electrophoretic coating composition is replenished with a replenishing coating agent having a lower neutrality than the cationic electrophoretic coating composition to adjust the pH value and solids concentration of the composition, by admixing the replenishing coating agent with a portion of the cationic electrophoretic coating composition being used for the coating process to prepare a replenishing composition and adding the replenishing composition to the cationic electrophoretic coating composition.

1 Claim, No Drawings

CATIONIC ELECTROPHORETIC COATING PROCESS

This is a continuation of the application Ser. No. 224,281 filed Apr. 10, 1980, now abandoned.

DESCRIPTION

1. Technical Field

This invention relates to a cationic electrophoretic coating process with use of a coating bath comprising a cationic electrophoretic coating composition in which process the coating bath is replenished with an electrophoretic coating composition to maintain the pH value of the bath approximately at neutrality without using an ion exchange membrane.

2. Background Art

Electrophoretic coating processes are divied into two general types: one in which cationic electrophoretic coating compositions are used, and the other in which anionic electrophoretic coating compositions are used. In affording corrosion resistance, the processes of the former type in which cationic coating compositions are used are much superior to those of the latter type using anionic coating compositions and are therefore very desirable for forming under-coats for motor vehicles, various apparatus, building materials, etc. which must be highly resistant to corrosion. Furthermore the former processes, in which the metal article to be coated serves as a cathode, permit only greatly inhibited dissolving out of metal from the article during the coating operation, with the resulting advantage of giving coatings of light color which are not available with the use of anionic compositions.

Since anionic electrophoretic coating compositions have been neutralized with an organic amine or inorganic base, the coating baths prepared therefrom have a pH of 6 to 8, while cationic electrophoretic coating compositions which have been neutralized with an organic acid or inorganic acid provide coating baths having widely varying pH values of 3 to 8. When used for electrophoretic coating operations, the anionic baths deposit an anionic resin on the article to be coated and involve a rise in pH, whereas the cationic baths deposit a cationic resin on the article, releasing an acid component serving as the neutralizing agent with an attendant decrease in pH value, as already well known. Accordingly the electrophoretic coating compositions must have their pH value adjusted to a specified range and be replenished with the resin component so as to have the solids concentration within a predetermined range. The pH value and solids concentration can be adjusted by replenishing the electrophoretic coating bath with a coating composition having a lower neutrality (namely a lower pH in the case of anionic bath, or a higher pH for cationic bath) than the anionic or cationic coating composition used for the bath to adjust both the pH value and solids content at the same time, or by using an ion exchange resin to remove the excessive base (in the case of anionic bath) or free acid (in the case of cationic bath) formed by the coating operation for the adjustment of pH value and separately adjusting the solids content of the bath. Of these two methods, the replenishing method is more preferable since both values are adjustable simultaneously by a simple procedure.

The cationic electrophoretic coating compositions, unlike those of anionic type, are available in a wide pH range of 3 to 8, so that there is the need to use different adjusting means in accordance with the pH value. The baths with a pH of 3 to 5 are adjustable to the desired level by replenishing the bath with a coating composition of lower neutrality, but an undesirable drawback is encountered in that corrosion develops in metal materials, such as sheet steel, forming the coating apparatus. Although baths with a pH of 6 to 8 are usable almost free of the above drawback as will be apparent also from the examples given later, it is impossible to replenish a bath of pH 6 to 8 with a coating composition of lower neutrality mainly because of the poor water dispersibility of the coating composition due to the difference in neutrality. If replenished, the electrophoretic bath is not in the form of a uniform aqueous dispersion suited to electrophoretic coating. The method in which an ion exchange membrane is used requires equipment including the membrane and cumbersome to maintain and involves the necessity of adjusting the solids concentration separately, hence undesirable.

We have carried out extensive research on the electrophoretic coating process with use of a cationic electrophoretic coating bath to explore a method of adjusting the bath to a pH of 6 to 8 by replenishing the bath with a coating composition having a low neutrality, and found that although it is impossible to replenish the bath directly with such a coating composition of low neutrality, the contemplated object can be fulfilled by the use of the composition as adjusted to a specified concentration by a specific procedure. Thus the object of the present invention is to provide an electrophoretic coating process with use of a bath prepared from an electrophoretic coating composition in which process the bath is replenished with a cationic electrophoretic coating composition having a low neutrality to adjust the pH of the bath to 6 to 8 and also to compensate for the solids consumed by the coating operation and maintain the solids concentration thereof within a specified range at all times.

DISCLOSURE OF INVENTION

The present invention provides an electrophoretic coating process with use of a cationic electrophoretic coating composition having a solids concentration of 10 to 25% by weight and a pH maintained at 6 to 8, characterized in that the cationic electrophoretic coating composition is replenished with a replenishing composition (1) and/or a replenishing composition (2), the replenishing composition (1) being prepared by admixing a replenishing coating agent having a lower neutrality than the cationic electrophoretic coating composition, substantially the same solids composition as the cationic electrophoretic coating composition except pigment and a solids concentration of 40 to 80% by weight, with a portion of the cationic electrophoretic coating composition being used for the coating process so that the resulting mixture has a solids concentration of 30 to 45% by weight, the replenishing composition (2) being prepared by admixing the replenishing coating agent with a portion of the cationic electrophoretic coating composition being used for the coating process to formulate a replenishing primary premix having a solids content of 25 to less than 30% by weight or more than 45 to 50% by weight and further admixing the premix with a portion of the cationic electrophoretic coating composition being used for the coating process so that the resulting mixture has a solids concentration of 10 to 30% by weight.

The present invention has been accomplished based on the novel finding that when replenishing a cationic electrophoretic coating composition having a pH of 6 to 8, a coating agent with a lower neutrality than the composition can be admixed therewith with satisfactory uniformity only when the coating agent is used in the special form of the above-mentioned replenishing composition (1) or (2), in other words only when the coating agent of lower neutrality is diluted or admixed with a specific diluent, namely with the cationic electrophoretic coating composition, to a specific concentration. Our research has revealed that a cationic electrophoretic coating agent having a lower neutrality than the cationic electrophoretic coating composition with a pH of 6 to 8, namely a cationic electrophoretic coating agent with a pH of higher than 8, when 25 to 50% by weight in solids concentration, has exceedingly poor stability and easily and relatively rapidly becomes a nonuniform aqueous coating dispersion, which it is substantially impossible to admix with the cationic electrophoretic coating composition or which, if admixed with a portion of the composition and immediately thereafter admixed with the remaining portion of the composition (although industrially almost infeasiable), has an insufficient solids concentration when the resulting mixture is so prepared as to maintain the same liquid level in the coating bath as the initial composition. Conversely when the dispersion is used in such an amount that the resulting mixture will have the desired solids concentration, the coating bath has a higher liquid level. Thus the adjustment of the solids concentration necessitates a cumbersome additional procedure.

According to the process of this invention which uses a replenishing coating agent having a lower neutrality than the cationic electrophoretic coating composition, the acid produced with the progress of the coating operation is consumed for neutralizing the basic resin of low neutrality contained in the coating agent to prevent the reduction of pH to the greatest possible extent, while the replenishing agent having a solids concentration of 40 to 80% by weight involves no problems in the adjustment of the solids content relative to the liquid level.

Best Mode of Carrying Out the Invention

The process of the invention will be described below in detail.

The cationic electrophoretic coating compositions useful in this invention are prepared in the usual manner by admixing water and a neutralizing agent with a basic water-dispersible resin which can be neutralized with an organic acid and/or an inorganic acid, with or without addition of a pigment, hydrophilic solvent, other additives (such as surfactants), etc. The compositions have a specified concentration of 10 to 25% by weight, more preferably 12 to 22% by weight. Such basic waterdispersible resins are cationic resins which can be diluted with water and which are prepared by reacting a basic resin containing nitrogen in its molecule with a compound capable of forming an acid compound or acid substance. Examples of useful resins are epoxy, acrylic and polybutadiene resins having many amino groups in the resin skeleton. More specific examples are cationic resins having as a coating forming component a product obtained by reacting (A) a mixture or reaction product of (a) a reaction product of an epoxy resin and a basic amino compound and (b) a polyamide resin having a basic amino group, with (B) a partially blocked polyisocyanate compound. Examples of neutralizing agents useful for neutralizing such resins are various organic acids and inorganic acids, among which preferable are organic acids such as acetic acid, hydroxylacetic acid, propionic acid, butyric acid, lactic acid, glycin (aminoacetic acid), etc. and inorganic acids such as sulfuric acid, hydrochloric acid, phosphoric acid; etc. Acetic acid and hydroxylacetic acid are especially preferable. The neutralizing agent is used in a neutralization equivalent weight of about 0.1 to 0.4, preferably 0.15 to 0.3, based on the amine value (usually about 50 to 200) of the resin. Various coloring pigments, extender pigments and corrosion inhibiting pigments are suitable for use as pigments. Examples are coloring pigments such as titanium dioxide, red iron oxide, carbon black, Cyanine Blue, etc., extender pigments such as calcium carbonate, clay, talc, barium sulfate, finely divided silica, etc., and corrosion inhibiting pigments such as lead chromate, strontium chromate, lead silicate, basic lead sulfate, etc. Examples of hydrophilic solvents are alcohol solvents such as ethanol, n-propanol, isopropanol, n-butanol, sec-butanol, tert-butanol, isobutanol, etc., glycol ether solvents such as ethylene glycol monomethyl ether, ethylene glycol monoethyl ether, ethylene glycol mono-n-propyl ether, ethylene glycol monoisopropyl ether, ethylene glycol monobutyl ether, diethylene glycol monobutyl ether, etc., and ester solvents such as methyl acetate, ethyl acetate, isopropyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol monobutyl ether acetate, etc.

Useful surfactants are nonionic and cationic surfactants, one or at least two of which are usable. A wide variety of nonionic surfactants are usable, among which preferable are polyethylene glycol alkyl ester, polyethylene glycol alkyl ether, polyethylene glycol alkyl phenyl ether, polyethylene glycol alkylamide and like polyethylene glycol compounds, and aliphatic esters of sorbitan and like partial ester compounds of polyhydric alcohols. More specific examples are polyethylene glycol monolaurate, polyethylene glycol lauryl ether, etc. Furthermore, a wide variety of cationic surfactants heretofore used are also usable in this invention, such as long-chain aliphatic amine salts, quaternary ammonium salts, etc. More specific examples are acetate of alkylethylenediamine, alkyltrimethyl ammonium halide, etc. The cationic electrophoretic coating composition may further incorporate various other known additives such as acrylic resin, polybutadiene resin, polyethylene glycol, polypropylene glycol, polyethylene glycol-polypropylene glycol copolymer, etc. These ingredients are used in substantially same proportions as conventionally used for cationic coating compositions. Typically the amount is usually up to 10% by weight based on the solids of the resin.

The replenishing coating agent to be used in this invention has substantially the same solids composition as the cationic electrophoretic coating composition except the proportion of the pigment component and is ⅔ to 1/5, preferably about ½ to ¼, lower than the cationic electrophoretic coating composition in the neutrality of the basic water-dispersible resin contained in the coating agent. However the coating agent is about 10 to 20% by weight larger than the cationic electrophoretic coating composition in the proportion of the pigment component. Such a coating agent of low neutrality can be prepared with use of a neutralizing agent in a reduced equivalent weight of usually 0.03 to 0.15 relative to the amine value of the basic waterdispersible resin. The replenishing coating agent to be used in this invention should have a solids concentration of 40 to 80% by weight, preferably 60 to 70% by weight. With a solids concentration of more than 80% by weight, the replenishing coating agent has an increased viscosity and becomes seriously unsuited to replenishment, whereas when having a solids concentration of less than 40% by weight, the coating agent causes the hydrophilic solvent in the electrophoretic coating composition to accumulate in the bath and is likely to result in a lower throwing power during coating operation. The replenishing coating agent must be substantially identical with the cationic electrophoretic coating composition in solids composition except the pigment component. If there is a great difference in the solids composition therebetween, it becomes impossible to continue the coating operation under the same conditions, giving rise to the necessity of resetting the conditions by an additional cumbersome procedure every time the bath is replenished.

According to the present invention, there are two kinds of compositions for replenishing the electrophoretic coating composition actually in use. Both the replenishing compositions are prepared from the replenishing coating agent and the cationic electrophoretic coating composition in use. The replenishing composition (1), one of them, is prepared by admixing the replenishing coating agent with a portion of the cationic electrophoretic coating composition actually being used for coating operation in such proportions that the resulting mixture has a solids concentration of 30 to 45% by weight. This solids concentration is critical; the replenishing composition (1), when having such a solid concentration, can be mixed with the cationic electrophoretic coating composition with high uniformity. Stated more specifically, since the replenishing coating agent and part of the cationic electrophoretic coating composition are mixed together into the replenishing composition (1) having a relatively high viscosity of 30 to 45% by weight in terms of solids concentration, a salt forming reaction proceeds easily smoothly to a full extent between the resin of low neutrality in the replenishing coating agent and the free acid component (i.e. neutralizing agent) already formed in the cationic electrophoretic coating composition with the progress of the coating operation, reducing the pH of the composition (1) itself to a level very close to the pH of the cationic electrophoretic coating composition. Consequently the composition (1), when added to the cationic electrophoretic coating composition, can be dispersed therein very effectively. The replenishing composition (1), when having a solids concentration of less than 30% by weight, is less viscous and has somewhat reduced dispersibility in the cationic electrophoretic coating composition, involving the likelihood of deposition of resin and pigment in the initial stage of coating operation following the replenishment. Conversely when having a solids concentration exceeding 45% by weight, the replenishing composition (1) has too high a viscosity and reduced compatibility with the cationic electrophoretic coating composition, with the tendency of giving a nonuniform dispersion. For the preparation of the replenishing composition (1) according to the invention, the proportions of the replenishing coating agent and the cationic electrophoretic coating composition to be mixed together are in no way limited and are not critical, provided that the composition (1) has a solids concentration of 30 to 45% by weight and that the replenishing coating agent and the cationic electrophoretic coating composition in actual use are used (since both have the predetermined concentrations as already described above). Usually about 20 to 200 parts by weight of the replenishing coating agent is mixed with 100 parts by weight of the cationic electrophoretic coating composition.

The other replenishing composition (2) to be used in this invention is prepared in the following manner. A replenishing primary premix is prepared first by mixing the replenishing coating agent and a portion of the cationic electrophoretic coating composition in actual use so that the premix has a solids concetration of 25 to less than 30% by weight or more than 45 to 50% by weight. The replenishing primary premix is prepared in the same manner as the replenishing composition (1) with the exception of altering the concentration alone. The replenishing primary premix is further admixed with a portion of the cationic electrophoretic coating composition actually in use so that the resulting mixture has a solids concentration of 10 to 30% by weight, whereby the replenishing composition (2) is formulated. The contemplated object of the invention can be fulfilled only by adjusting the two concentrations, namely the solids concentration of the replenishing primary premix and the solids concentration of the final secondary mixture, namely of the replenishing composition (2), when formulating the replenishing composition (2). (The adjustment will be hereinafter referred to as "two-stage concentration adjustment".) Thus the contemplated object is not achievable when the replenishing composition (2) has a concentration outside the range of 10 to 30% by weight even if the concentration of the replenishing primary premix is 25 to less than 30% by weight or more than 45 to 50% by weight, or conversely when the concentration of the replenishing primary premix is outside the range of 25 to 50% by weight even if the concentration of the replenishing composition (2) is in the range of 10 to 30% by weight. When the replenishing primary premix has a concentration of 30 to 45% by weight (thus corresponding to the replenishing composition (1)), the two-stage concentration adjustment need not always be performed.

The two stage concentration adjustment will be further described below. The replenishing primary premix, when having a concentration of less than 25% by weight, has an exceedingly low viscosity in itself, and even if the premix is subsequently made into a secondary mixture, the resulting composition (2) will have poor dispersibility in the cationic electrophoretic coating composition, with the likelihood of producing resin and pigment depositions. With a concentration of 25 to less than 30% by weight, the replenishing primary premix has a lower viscosity and slightly poor dispersibility and can not be added directly to the cationic electrophoretic coating composition for replenishment, whereas when the premix is made into a secondary mixture, the mixture has improved dispersibility suited to replenishment. Conversely when exceeding 50% by weight, the premix has too high a viscosity, failing to fulfil the contemplated object even if used in the form of a secondary mixture.

As is the case with the replenishing composition (1), the proportions of the replenishing coating agent and the cationic electrophoretic coating composition in actual use to be formulated into the replenishing composition (2) are of secondary importance. Usually, however, 50 to 1000 parts by weight of the latter is used per 100 parts by weight of the former for the preparation of the replenishing primary premix. The replenishing primary premix is used in an amount of 0.5 to 30 parts by weight per 100 parts by weight of the cationic electrophoretic coating composition in actual use.

The process of the invention is practiced by replenishing the cationic electrophoretic coating composition with the replenishing composition(s) (1) and/or (2). The proportions of the replenishing compositions to be added to the cationic electrophoretic coating composition are determined suitably in accordance with the reduction of the pH of the cationic electrophoretic coating composition and with the consumption of the solids thereof, in other words in accordance with the degree of progress of the coating operation. Similarly when to replenish the composition is suitably determined in accordance with the progress of the coating operation. As a rule, the electrophoretic coating composition is replenished before the pH of the composition reduces to 6.0 or lower.

The replenishing method of this invention can be practiced under exactly the same electrophoretic coating conditions as heretofore employed with use of a conventional electrophoretic coating apparatus in the usual manner. Typically, for example, voltage of 150 to 400 V is applied to the work for 1 to 5 minutes at a bath temperature of 20 to 35° C. The current is passed through the work as fully immersed in the bath or before immersion. Since the operation is conducted at a pH of 6 to 8 according to this invention, there is no need to use an acid-resistant apparatus, but various apparatus are advantageously usable, which typically are made, for example, of carbon steel pipe for piping uses, rolled sheet steel for general structural uses, lining sheet steel, etc.

The process of this invention has the following advantages.

(a) The use of a cationic electrophoretic coating composition of low neutrality for replenishment completely eliminates the necessity of using an ion exchange membrane, consequently obviating the drawbacks attributable to the use of the exchange membrane.

(b) The apparatus heretofore employed for electrophoretic coating processes with use of anionic electrophoretic coating compositions are usable as such, while there is no need to use a special acid-resistant apparatus, hence advantageous.

Examples are given below, in which the parts are by weight.

EXAMPLE 1

An epoxy-type polyamino resin (trade mark "Elecron No. 9000," product of Kansai Paint Kabushiki Kaisha) having an amine value of 80 was dissolved in 40 parts of 1:1 mixture of ethylene glycol monoethyl ether and sec-butanol and partially neutralized with 0.15 equivalent of hydroxylacetic acid to obtain a varnish. To the varnish were added 20 parts of red iron oxide and 5 parts of talc per 100 parts of the solids of the varnish, and the mixture was treated in a pebble mill for 20 hours to obtain a dispersion. The coating dispersion was diluted with deionized water to a solids concentration of 20% to prepare a cationic electrophoretic coating composition (I). Table 1 shows the pH value of the cationic electrophoretic coating composition (I) serving as an electrophoretic coating bath and the state of corrosion produced in a black-skinned steel panel (about 150×90×3 mm) when the panel had been immersed in the bath at 30° C. for a prolonged period of time.

The electrophoretic coating bath was used for an electrophoretic coating operation continuously for a predetermined period of time. Forty parts of a replenishing coating agent of low neutrality (63% solids) as listed in Table 2 was thereafter slowly added to a 100-part portion of the bath with stirring and uniformly mixed therewith to obtain a replenishing composition (1). The replenishing composition (1) was slowly added directly to the electrophoretic coating bath for replenishment. This gave an increased solids content and a higher pH to the bath. The bath was continuously usable for a further coating operation with satisfactory results, giving good coatings. Table 2 also shows the properties and results of evaluation thereof.

EXAMPLE 2

An epoxy-type polyamino resin (trade mark "Elecron No. 9000," product of Kansai Paint Kabushiki Kaisha) having an amine value of 80 was dissolved in 40 parts of 2:1 mixture of ethylene glycol monoethyl ether and sec-butanol and partially neutralized with 0.30 equivalent of hydroxylacetic acid to obtain a varnish. To the varnish were added 20 parts of red iron oxide and 5 parts of talc per 100 parts of the solids of the varnish, and the mixture was treated in a pebble mill for 20 hours to obtain a dispersion. The coating dispersion was diluted with deionized water to a solids concentration of 20% to prepare a cationic electrophoretic coating composition (II).

Table 1 shows the pH value of the cationic electrophoretic coating composition (II) and the state of corrosion produced in a black-skinned steel panel (about 150×90×3 mm) when the panel had been immersed in the bath at 30° C. for a prolonged period of time.

The electrophoretic coating bath was used for an electrophoretic coating operation continuously for a predetermined period of time. Eighty-five parts of a replenishing coating agent of low neutrality (70% solids) as listed in Table 2 was thereafter slowly added to a 100-part portion of the bath with stirring and uniformly mixed therewith to obtain a replenishing composition (1), which was slowly added directly to the electrophoretic coating bath for replenishment. This gave an increased solids content and a higher pH to the bath. The bath was continuously usable for a further coating operation with satisfactory results, giving good coatings. Table 2 also shows the properties and results of evaluation thereof.

EXAMPLE 3

The electrophoretic coating bath (20% solids) of Example 2 was used continuously for an electrophoretic coating operation for a specified period of time. Twenty parts of a replenishing coating agent of low neutrality (70% solids) listed in Table 2 was thereafter uniformly admixed with a 30-part portion of the bath in a pipeline homomixer, Model 2SL (product of Tokushu Kika Kogyo Kabushiki Kaisha) to prepare a mixture, which was directly supplied to a circulation conduit extending from a subtank for the bath to the main tank. This gave an increased solids content and a higher pH to the bath. The bath was continuously usable for a further coating operation with satisfactory results, giving good coatings. Table 2 shows the properties and results of evaluation thereof. Table 1 shows the state of corrosion developed in a steel panel when the panel was immersed in the bath for a prolonged period of time.

EXAMPLE 4

Twenty parts of the same replenishing coating agent (63% solids) as used in Example 1 was slowly uniformly admixed, with stirring, with a 100-part portion of the same electrophoretic coating bath as used in Example 1 to prepare a replenishing primary premix. The premix was then slowly uniformly admixed with another 100-part portion of the bath to obtain a replenishing composition (2), which was further added to the electrophoretic coating bath for replenishment. This gave an increased solids content and a higher pH to the bath. The bath was continuously usable for a further coating operation with satisfactory results, giving good coatings. Table 3 shows the properties and results of evaluation thereof.

EXAMPLE 5

An epoxy-type polyamino resin (trade mark "Elecron No. 9000," product of Kansai Paint Kabushiki Kaisha) having an amine value of 80 was dissolved in 40 parts of 2:1 mixture of ethylene glycol monoethyl ether and sec-butanol and partially neutralized with 0.30 equivalent of hydroxylacetic acid to obtain a varnish. To the varnish were added 20 parts of red iron oxide and 5 parts of talc per 100 parts of the solids of the varnish, and the mixture was treated in a pebble mill for 20 hours to obtain a dispersion. The coating dispersion was diluted with deionized water to a solids concentration of 15% to prepare a cationic electrophoretic coating composition (II).

Table 1 shows the pH value of the cationic electrophoretic coating composition (II) and the state of corrosion produced in a black-skinned steel panel (about 150×90×3 mm) when the panel had been immersed in the bath at 30° C. for a prolonged period of time. The electrophoretic coating bath was used for an electrophoretic coating operation continuously for a predetermined period of time. A 70-part portion of the bath was thereafter slowly uniformly admixed, with stirring, with 20 parts of a replenishing coating agent (70% solids) of low neutrality as shown in Table 3 to prepare a replenishing primary premix. The premix was uniformly admixed with a 350-part portion of the bath with use of a pipeline homomixer, Model 2SL (product of Tokushu Kika Kogyo Kabushiki Kaisha) to formulate a replenishing composition (2), which was added to the bath for replenishment. This gave an increased solids content and a higher pH value to the bath. The bath was continuously usable for a further coating operation with satisfactory results, giving good coatings. Table 3 shows the properties and results of evaluation thereof.

TABLE 1

|  | Example 1 | Example 2 | Example 3 |
|---|---|---|---|
| pH value | 7.5 | 6.5 | 6.5 |
| Corrosion in steel panel (30° C.) Immersed portion |  |  |  |
| In 1 month | No change (slight color change) | No change (slight color change) | No change (slight color change) |
| In 3 months | No change (slight color change) | No change (slight color change) | No change (slight color change) |
| Non-immersed portion |  |  |  |
| In 1 month | Slight partial corrosion | Slight partial corrosion | Slight partial corrosion |
| In 3 months | Slight partial corrosion | Partial corrosion | Partial corrosion |

TABLE 2

|  | Example 1 | Example 2 | Example 3 |
|---|---|---|---|
| pH of electrophoretic coating bath | 7.5 | 6.5 | 6.5 |
| Amount of neutralizing agent (equivalent) |  |  |  |
| Bath | 0.15 | 0.30 | 0.30 |
| Replenishing coating agent | 0.05–0.10 | 0.1–0.15 | 0.1–0.15 |
| Solids (%) |  |  |  |
| Coating bath | 20 | 20 | 20 |
| Replenishing coating agent | 63 | 70 | 70 |
| Replenishing comp. | 32.3 | 43.0 | 40.0 |
| Stability to continuous coating (3 turnovers) |  |  |  |
| Coating | 0 | 0 | 0 |
| Replenishing suitability | 0 | 0 | 0 |
| pH value of electrophoretic bath | 7.5 | 6.5 | 6.5 |
| pH adjustable range determined by continuous coating test | 7.2–7.9 | 6.2–7.1 | 6.2–7.1 |
| Corrosion in steel panel by bath tested as above (3 month) |  |  |  |
| Immersed portion | No change (slight color change) | No change (slight color change) | No change (slight color change) |
| Non-immersed portion | Slight partial corrosion | Partial corrosion | Partial corrosion |

Note:
The mark "0" listed above indicates that the coating is highly smooth surfaced, planar and uniform in thickness and is free of any pinholes, dents or voids, or that the bath can be replenished and thereafter used free of any troubles (same as in the table below).

TABLE 3

|  | Example 4 | Example 5 |
|---|---|---|
| pH of electrophoretic coating bath | 7.5 | 6.5 |
| Amount of neutralizing agent (equivalent) |  |  |
| Bath | 0.15 | 0.30 |
| Replenishing coating agent | 0.05–0.10 | 0.1–0.15 |

TABLE 3-continued

|  | Example 4 | Example 5 |
|---|---|---|
| Solids (%) | | |
| Coating bath | 20 | 15 |
| Replenishing coating agent | 63 | 70 |
| Primary premix | 48.7 | 27.2 |
| Stability to continuous coating (3 turnovers) | | |
| Coating | 0 | 0 |
| Replenishing stability | 0 | 0 |
| pH value of electrophoretic bath | 7.5 | 6.5 |
| pH adjustable range determined by continuous coating test | 7.2–7.9 | 6.2–7.1 |
| Corrosion in steel panel by bath tested as above (3 month) | | |
| Immersed portion | No change (slight color change) | No change (slight color change) |
| Non-immersed portion | Slight partial corrosion | Partial corrosion |

INDUSTRIAL APPLICABILITY

The present process is very useful in industries for applying coating compositions to motor vehicles, building materials and various apparatus to form under coats or single finishing coats.

We claim:

1. In an electrophoretic coating process using a bath prepared from a cationic electrophoretic coating composition having a solids concentration of 10 to 25% by weight and a pH maintained at 6 to 8 in which process the bath is replenished with a cationic electrophoretic coating composition having a low neutrality to adjust the pH to 6 to 8 and maintain the solids concentration at 10 to 25% by weight, the improvement comprising maintaining said pH and said solids concentration without using an ion exchange membrane by using as said replenishing composition a composition selected from the group consisting of a replenishing composition (1) and a replenishing composition (2), composition (1) and a replenishing composition (2), the replenishing composition (1) being prepared by admixing a replenishing coating agent having a lower neutrality than the cationic electrophoretic coating composition, substantially the same solids composition as the cationic electrophoretic coating composition except pigment and a solids concentration of 40 to 80% by weight, with a portion of the cationic electrophoretic coating composition being used for the coating process so that the resulting mixture has a solids concentration of 30 to 45% by weight, the replenishing composition (2) being prepared by admixing the replenishing coating agent described above with a portion of the cationic electrophoretic coating composition being used for the coating process to formulate a replenishing primary premix having a solids content of 25 to less than 30% by weight or more than 45 to 50% by weight and further admixing the premix with a portion of the cationic electrophoretic coating composition being used for the coating process so that the resulting mixture has a solids concentration of 10 to 30% by weight.

* * * * *